US005873109A

United States Patent [19]

High

[11] Patent Number: 5,873,109

[45] Date of Patent: Feb. 16, 1999

[54] DEVICE AND METHOD FOR DISPLAYING TEXT OF AN ELECTRONIC DOCUMENT ON A SCREEN IN REAL TIME

[76] Inventor: Clifford R. High, 4305 Biscay St. NW., Olympia, Wash. 98502

[21] Appl. No.: 657,212

[22] Filed: Jun. 3, 1996

[51] Int. Cl.[6] .................................................... G06F 17/30

[52] U.S. Cl. ........................................... 707/517; 707/507

[58] Field of Search ............................ 345/471; 707/507, 707/517

[56] References Cited

U.S. PATENT DOCUMENTS

| | | | |
|---|---|---|---|
| 3,579,196 | 5/1971 | Gregg | 707/507 |
| 3,611,301 | 10/1971 | Parks | 340/172 |
| 5,147,205 | 9/1992 | Gross et al. | 434/169 |
| 5,233,334 | 8/1993 | Takebe et al. | 345/471 |
| 5,566,289 | 10/1996 | Ikeo et al. | 345/448 |

*Primary Examiner*—Almis R. Jankus
*Assistant Examiner*—Huedung X. Cao
*Attorney, Agent, or Firm*—Sidley & Austin; Maxim H. Waldbaum; Meir Y. Blonder

[57] ABSTRACT

A device for displaying the text of an electronic document on a screen one word at a time. The display device includes a processor for storing the electronic document; a one-word display for sequentially displaying only one word of the document at a given time; and a user control for allowing the user to control, in real time, the legibility characteristics such as color, font size and display speed. The device allows display speeds in excess of 3,000 words per minute to be achieved while at the same time allowing the user to alter or modify the legibility characteristics of the displayed words without the need for interrupting the display of words.

41 Claims, 10 Drawing Sheets

DEVICE AND METHOD FOR DISPLAYING TEXT OF AN ELECTRONIC DOCUMENT ON A SCREEN IN REAL TIME

BACKGROUND OF THE INVENTION

The present invention relates to a device and method for displaying text on a screen. More particularly, the present invention relates to a device and method for displaying the text of an electronic document on a screen for reading by a user in real time.

Present-day computer monitors are generally configured to present textual information in a manner that replicates the central features of the more traditional form of communicating by way of the printed word on paper. For example, in many cases, when reading an electronic document on a computer screen, the information is generally presented in a fashion intended to resemble the reading of a page of a book, report or other printed document. Although there are some similarities between printed and electronically-displayed documents, there are many differences.

In traditional documents printed on paper, the storage media for the document is the text inscribed or written on the reflective surface of the paper. The storage media—the paper—also serves as the display media. In other words, writing the textual information onto the paper simultaneously imparts and fixes the display characteristics of the document to be presented to a subsequent reader. Accordingly, the legibility of the text is fixed by the author or printing process at the time the text is written onto the paper. In the case of paper documents, the author/printer of the document (and not the reader) has complete control over the display characteristics of the text (i.e., the legibility). In other words, the page layout, the font type, size and other legibility characteristics of the document cannot be altered by the ultimate reader of the text. In addition, each reader of the text is confronted with the same display which cannot be tailored or optimized to his or her personal preferences.

In contrast, in the case of electronic documents displayed on a computer screen, the legibility of the text is separated both logically and functionally from the storage media. In other words, the legibility is no longer controlled by the original author of the document, but by some outside source or other factors. Although the user of a computer or other electronic system generally has some degree of control over the display of the text, such systems can place several obstacles in front of the person who desires to read the text of an electronic document in a manner most convenient for that person.

In particular, a computer monitor itself can create problems in reading an electronic document. These problems can include poor edge and character contrast of the displayed text, a display surface which is not flat in the case of CRT screens, font types and sizes which are translations of fonts initially designed and optimized for reading from a reflected surface such as paper but not an irradiated one as in the case of computer monitors. Additional problems in reading text from computer monitors arise due to the height to width ratio of the monitor. For printed documents, the height of the document is generally the larger of the two dimensions. In the case of computer monitors, the inverse is usually true: the width (and not the height) of the monitor is generally the larger of the two dimensions. While these problems cannot normally be addressed unless the monitor is redesigned, their negative impact on legibility can be magnified by the software programs being used to control the monitor.

Methods of presenting text to computer monitors by software generally fall into two basic approaches: character-based and graphical user interface-based, the later of which is more widely used in present-day computer monitors. Graphical user interfaces present further obstacles to legibility in displaying electronic documents on a computer monitor. Such graphical user interfaces frequently will provide color and shading in an attempt to present the reader with the illusion of a multidimensional space as encountered when reading text on a printed page. However, that illusion is not perfect.

This multidimensional space is typically presented to the user as though the surface is that of one or more sheets of paper on a desktop. This presentation is generally intended to "trick" the user into believing the text is being displayed on a printed page. The actual surface is an electrically charged chemical applied to the opposite side of a sheet of glass. Though the use of shading and other techniques does present a credible version of a multiple dimensional reality, the fact that it is an illusion being projected on the far side of the screen is always readily apparent through the glare of ambient light on the actual glass surface. This duality of reflected versus projected light on the screen significantly impairs the legibility of the text displayed through this illusion. A demonstration of the significance of this problem is the size of the industry devoted to the manufacture of glare shields and guards for computer monitors. The primary impact of this problem on the user is most evident when attempting to read for comprehension of non-trivial information from a large body of text.

Further complicating and degrading the legibility of graphical user interface-based displays is relates to a fundamental assumption upon which such interfaces are built: that the final product of the electronic document will be a version printed to paper. This is a key factor affecting legibility as it clearly places the emphasis on a printed version of the material. In this sense, the computer industry has focused on the legibility factors affecting the memorialization of a document after it has been printed on paper and generally not on legibility factors affecting the presentation of the text on the computer monitor itself. The computer monitor in this sense has been considered merely a place to manipulate the text of an electronic document for final printout to paper.

Accordingly, computer monitors generally target their font type and size to the final document printed on paper. True font sizes and typeface reproduction are not created on the monitor but rather only after printing on the printed paper. The screen representations of the typeface are generally not "to scale" but are intended to mock-up the printed output within the framework of the computer monitor's height to width aspect ratio. This mock-up generally uses a translation algorithm which alters all aspects of the displayed text including perceived character height, the line spacing and the aspect ratio of the typeface ascendants and descendants. This is done to make the characters look as near as possible like the paper-printed copy. In fact, this philosophy of software design is widely touted as WYSIWYG ("What You See Is What You Get"). In fact, some manufacturers of graphical user interface displays even employ claims of "accurate" reproduction of paper and page displays as selling points for their respective products.

Further problems with reading text from computer monitors are presented by the software being used by the computer at the so-called "application" level. Programs such as word processors, spreadsheets, or database management software, or project management software, or electronic mail are focused on the creation of text, or its retrieval for editing rather than its presentation for display on the computer monitor. These programs have generally adopted a "page" format. This is to say that these programs present their displays as though they were printing the information on a sheet of paper pasted to the inside of the computer monitor. In using this page paradigm on today's computer monitors, software programs typically provide some form of scrolling to access the hidden parts of the text of a page that cannot be shown on the screen due to the size limitations forced on the display by the aspect ratio of the monitor. This scrolling (either in the horizontal or vertical directions) can place serious constraints on the reader's access to the text by imposing delays as the chosen part of the page is scrolled into view. Further reading speed and comprehension problems can be caused by the shift in focus to the control mechanisms of the software rather than reading the displayed text.

The overall effect of all of the above problems on the final legibility of displayed text is that the average reading speed of the user will be slower in reading an electronic document than reading a printed document. In addition, the comprehension level of the reader will be lower than when reading the corresponding material from paper. There will also be more physical energy expended by the reader in reading from the computer screen. Further effects include a rise in eye, neck and facial muscle tension as the reader attempts to compensate for the poor presentation and legibility of the electronic document.

The conventional display of electronic documents on a computer monitor also presents severe obstacles to readers with disabilities, either perceptual, cognitive or physical. In the case of a reader who is paralyzed, the energy required to manipulate the complex scrolling involved is often debilitating. Additionally, persons with visual impairments will have difficulty in customizing the display of traditional software programs to a level that is legible to that particular person. And as font size is increased in displaying electronic documents, the reading speed generally decreases due to the increased intrusion of complex scrolling.

In addition to the above, the display of text on computer monitors can present some obstacles to effective reading in areas such as manufacturing sites where the environment can be considered dirty for reading purposes. This would include any site with local pollution to the point that general atmospheric refraction of light is increased above an acceptable level to make it difficult to discern the text on a screen, or where particulate material accumulates on a screen to a level of obscuring too many pixels.

In order to address some of the above problems associated with the display of text from an electronic document on a screen, there has been a prior attempt to fundamentally alter the manner in which the text is displayed. In particular, a method has been proposed whereby the text of an electronic document is displayed on a computer monitor one word at a time. A microprocessor is used to automatically and sequentially update the one-word screen with the next word in the document so that the user would not be distracted with scrolling. This method would allow the user to pay full attention to the words being displayed on the one-word monitor.

A problem encountered with the above proposed method for displaying text is that with today's conventional desk- and lap-top computer systems, the interaction of the operating software with the computer hardware was such that real-time control of the display process could not achieved efficiently. In particular, since conventional software control of desk- and lap-top computers is achieved using sequential processing, the computer monitor could not be updated fast enough, without interruption at high display speeds, if it was desired to be able to allow the reader of the document to simultaneously control the legibility characteristics of the text (i.e., font type, size, color, display speed, etc.). As this inventor has now determined, as will be explained below, this deficiency of the prior art was due to the fact that in order for such a system to work, the microprocessor must perform three separate functions simultaneously: (1) it must continuously read into memory the relevant portions of the subject document from a storage device, (2) it must constantly update the one-word screen with the next word in the document, and (3) it must react to and keep track of a user's desired legibility characteristics entered through a keyboard.

Using conventional software control of today's desk- and lap-top computers, the prior art could not provide a display device that was capable of uninterrupted, one-word display of an electronic document while at the same time being able to allow the reader of the document to simultaneously control the legibility characteristics of the text in real time.

In light of the above, it would be desirable to be able to provide a device and method for the efficient and convenient display of the text of an electronic document on a screen one word at a time.

It would also be desirable to be able to provide a device and method for uninterrupted, one-word display of an electronic document being able to allow the reader of the document to simultaneously control the legibility characteristics of the text in real time.

It would further be desirable to be able to provide a device and method for displaying the text of an electronic document one word at a time using a low-cost processor for controlling the reading and displaying of the document.

SUMMARY OF THE INVENTION

It is an object of this invention to provide a device and method for the efficient and convenient display of the text of an electronic document on a screen one word at a time.

It is also an object of this invention to provide a device and method for uninterrupted, one-word display of an electronic document being able to allow the reader of the document to simultaneously control the legibility characteristics of the text in real time.

It is a further object of this invention to provide a device and method for displaying the text of an electronic document one word at a time using a low-cost processor for controlling the reading and displaying of the document.

In accordance with the present invention there is provided a device for displaying the text of an electronic document on a screen. The display device includes: (1) a processor having a first input adapted to be coupled to a storage device for storing the electronic document; (2) a screen coupled to the processor for sequentially displaying one word of the document at a time; and (3) a user control coupled to the processor for allowing the user to control the legibility of the displayed words in real time.

The present invention also includes a method for displaying the text of an electronic document on a screen comprising the steps of: (a) electronically reading the document stored on a storage device; (b) sequentially displaying one word of the document at a time on the screen; and (c) altering the legibility of the displayed words in real time without substantial interruption of step (b).

BRIEF DESCRIPTION OF THE DRAWINGS

The above and other objects and advantages of the invention will be apparent upon consideration of the following detailed description, taken in conjunction with the accompanying drawings, in which like-reference numerals refer to like-parts throughout, and in which.

DETAILED DESCRIPTION OF THE INVENTION

Figure 1:
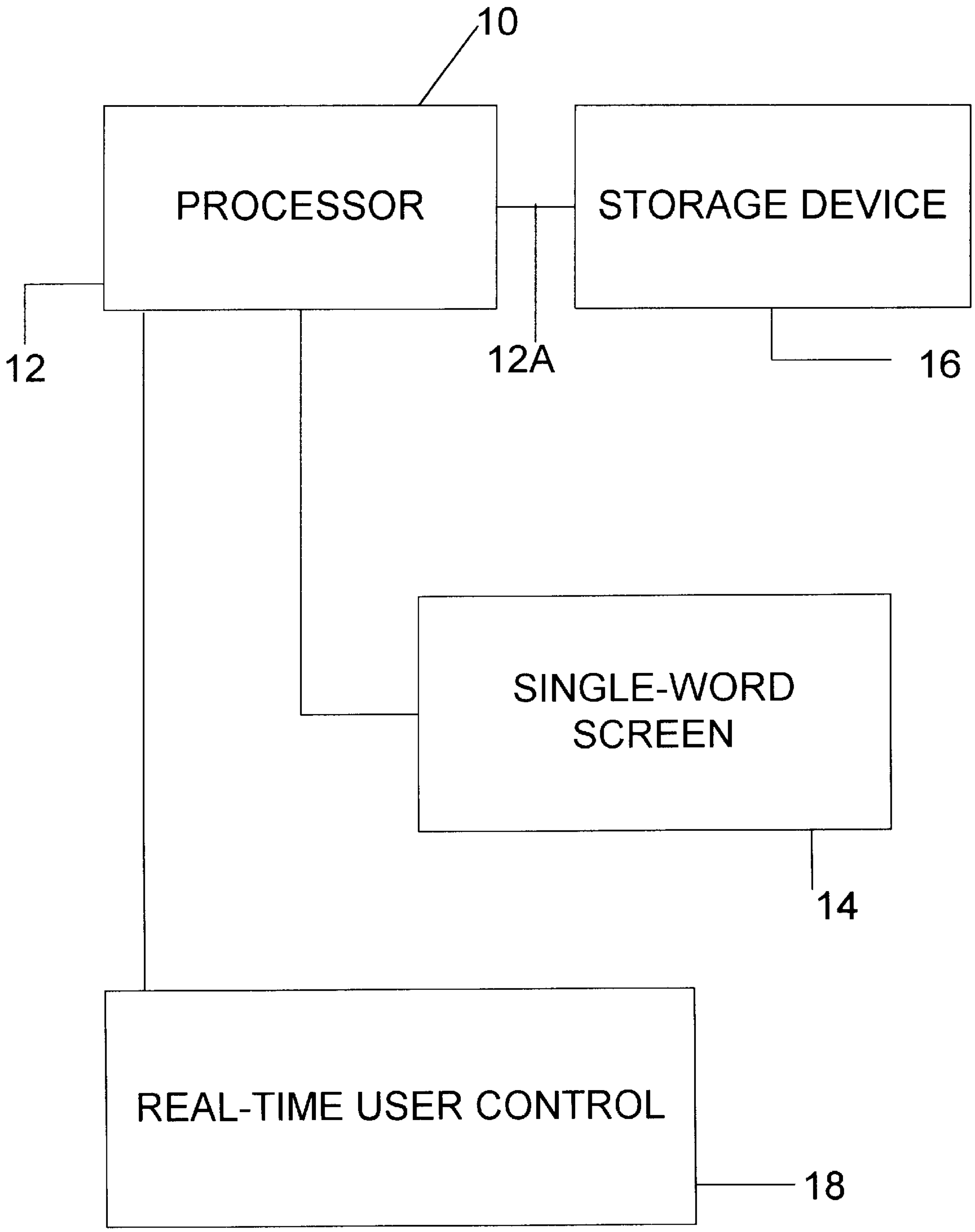
FIG. 1 is a schematic block diagram of a display device in accordance with the present invention.

FIG. 1 is a schematic block diagram of a display device in accordance with the present invention. Display device 10 includes processor 12, screen 14, storage device 16, real-time user control 18 and works as follows. Processor 12 includes an input 12A coupled to storage device 16 which contains an electronic document to be (1) read by processor 12 and (2) subsequently displayed on screen 14. In accordance with the present invention, screen 14 is adapted to display only a single word of the electronic document at a time. Processor 12 continuously controls screen 14 so that each word contained in the electronic document stored in storage device 16 is sequentially displayed on screen 14 so that a user can continuously read the document under real time control. Specifically, real-time user control 18 allows the user to control the display or legibility characteristics of the text being displayed on screen 14 so as to allow the user to adjust such characteristics in real time to his or her own personal specifications. In accordance with the present invention, processor 12 is constructed so that an adjustment of user control 18 by the user does not substantially interrupt the display of words on screen 14 by processor 12. Accordingly, a user can simultaneously enjoy uninterrupted reading of the words being displayed on screen 14 and the ability to control the display or legibility characteristics of those words in real time so as to facilitate efficient reading of the text being displayed.

Figure 2:
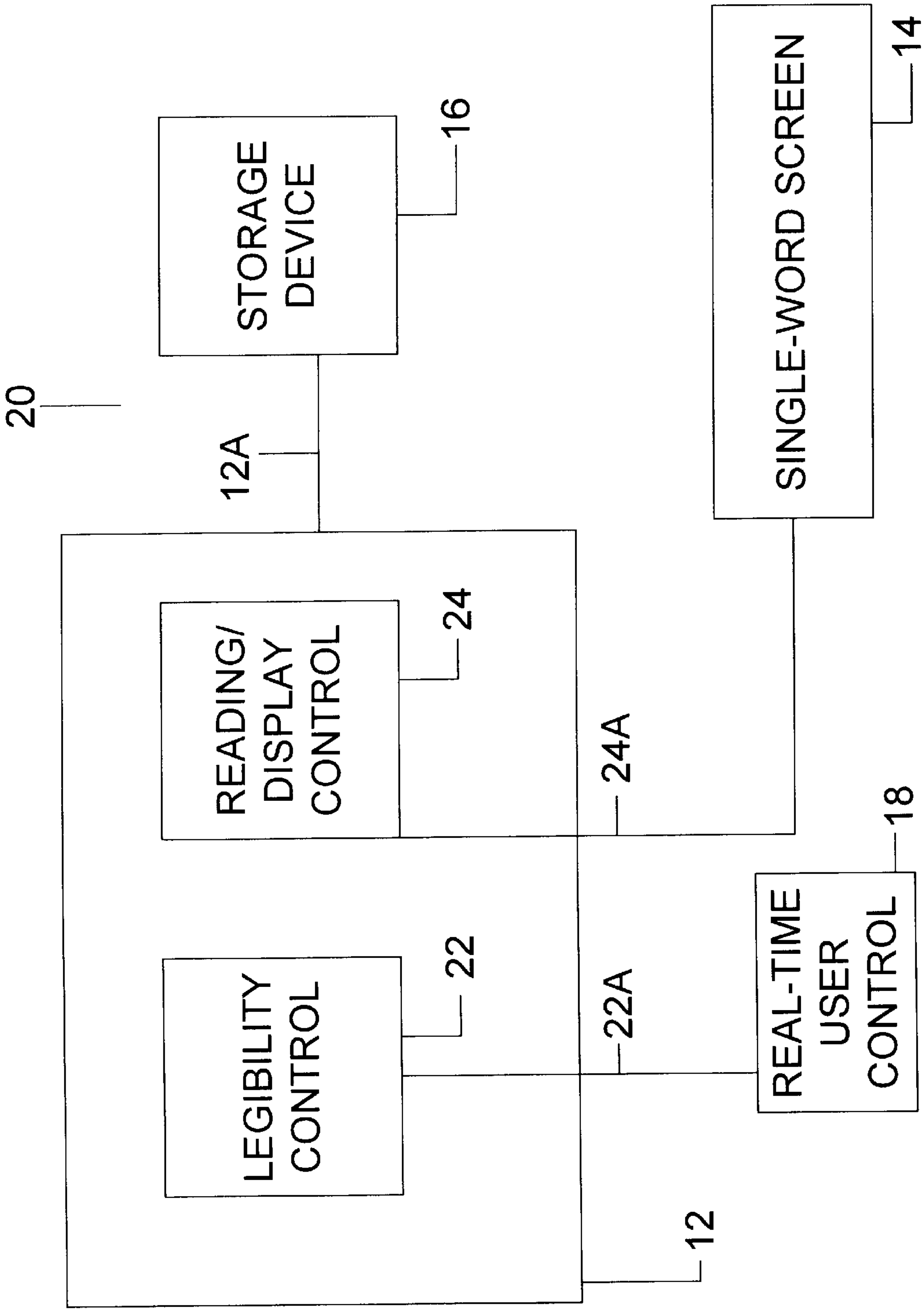
FIG. 2 a schematic block diagram illustrating a preferred embodiment of he display device of FIG. 1.

FIG. 2 a schematic block diagram illustrating a preferred embodiment of the display device of FIG. 1. In particular, processor 12 includes two logically separated control units 22 and 24 for allowing the display device to simultaneously display words on screen 14 without substantial real time interruption when a user desires to alter the legibility characteristics of the words being displayed through real-time user control 18. Control unit 22 is a legibility control having an input 22A coupled to user control 18 for receiving instructions from a user on desired legibility parameters to be discussed in more detail below. Control unit 24 is a reading/display control having an input 12A coupled to storage device 16 for receiving an electronic document to be displayed one word at a time on screen 14. Reading/display control 24 also includes a terminal 24A coupled to screen 14 for displaying the words of the electronic document.

In accordance with the present invention, the devices illustrated in FIGS. 1 and 2 can be conventional desk- or lap-top computers if the microprocessors of those computers (e.g., Intel 386, 486, Pentium or other similar microprocessors) are programmed in accordance with the method of the present invention. In such an embodiment, single-word screen 14 would comprise a computer monitor and real-time user control 18 would comprise a keyboard or pointing device (e.g., a mouse).

Figure 3:
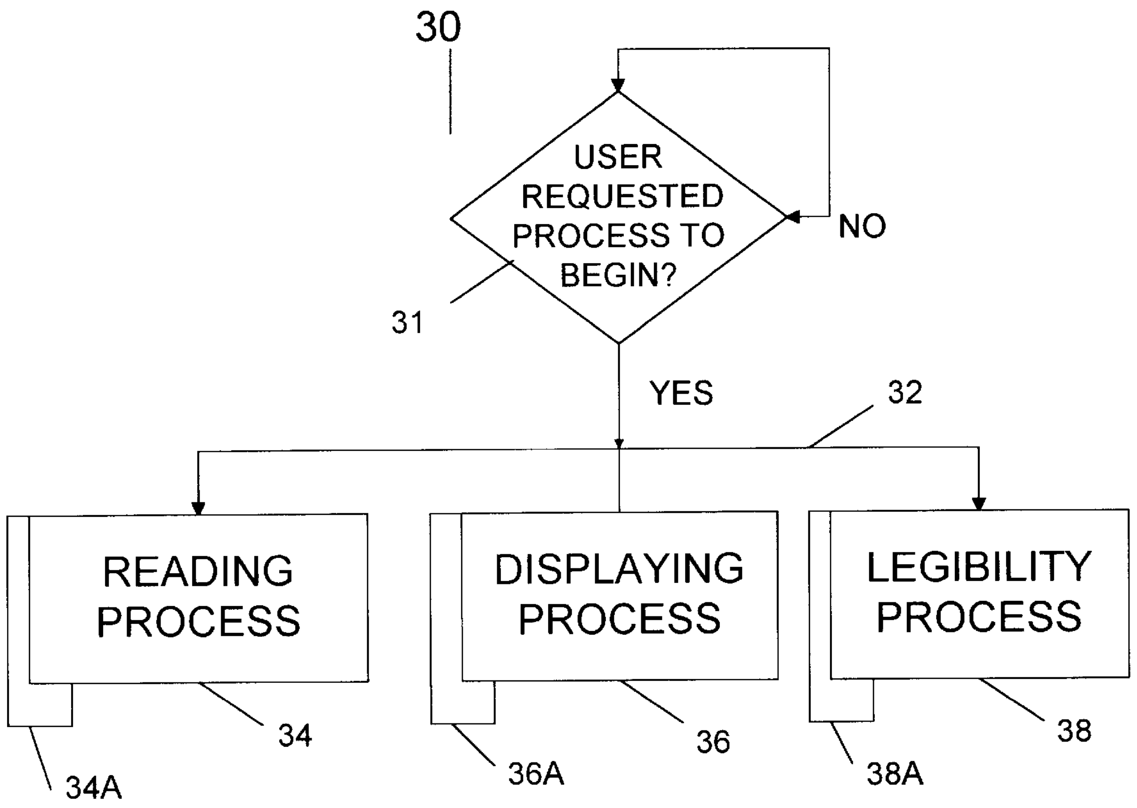
FIG. 3 is an exemplary logic diagram for the preferred embodiment of the method of the present invention.

FIG. 3 is an exemplary logic diagram for the preferred embodiment of the method of the present invention. Method 30 includes three processes 32, 33 and 34 (to be discussed in more detail below) which simultaneously execute, in a parallel fashion, separate goals for controlling the display device of the present invention. In general, method 30 works as follows.

Method 30 begins at test 31 where it is determined whether or not the user has requested the process to begin. If not, the method repeats test 31. If yes, the method simultaneously proceeds to processes 34, 36 and 38 under multi-threaded operation as discussed below. Reading process 34, displaying process 36 and legibility process 38 are coupled through inter-process communication 32 but are responsible for the following separate functions. Reading process 34 performs the task of reading from the storage device (or memory) the relevant portions of the electronic document stored for subsequent display on the one-word screen. While the display device is activated for displaying, loop 34A of reading process 32 guarantees that the device is reading the electronic document from memory as appropriate. In accordance with the present invention, reading process 32 is able to directly read the electronic document from the storage device (or memory), in real time, without the need for first converting the document into a second document or file before its displayed.

Displaying process 36 performs the task of displaying one word at a time the appropriate word of the electronic document. While the display device is activated, loop 36A guarantees that the device is displaying the relevant word under the legibility characteristics chosen by the user via the real-time user control discussed above. Displaying process 36 receives the word to be displayed from the reading process 34 via inter-process communication 38 which links reading process 34 and displaying process 36.

Legibility process 38 performs the task of monitoring the real-time user control so the user can alter the legibility characteristics of the displayed words in real time as appropriate. This agent is responsible for controlling characteristics such as the font type, size, color, display speed and other characteristics to be discussed in more detail below.

In contrast to conventional programming of processors using so-called sequential processes, the method of the present invention uses processes which operate in parallel so that the display device can be efficiently controlled without the need for interruption in order to alter the legibility characteristics of the displayed text. As will be apparent to those of ordinary skill in the art, reading process 34, displaying process 36 and legibility process 38 can be implemented using a variety of programming languages (e.g., procedural languages such as COBOL, C, PASCAL and FORTRAN or declarative languages such as PROLOG, LISP and POPlog). As will be discussed in more detail below, the preferred programming language for implementing method 30 of the present invention is through a language which inherently provides backward chaining processes (e.g., repeat-fail loops) such as those provided in the PROLOG language.

Figure 4A:
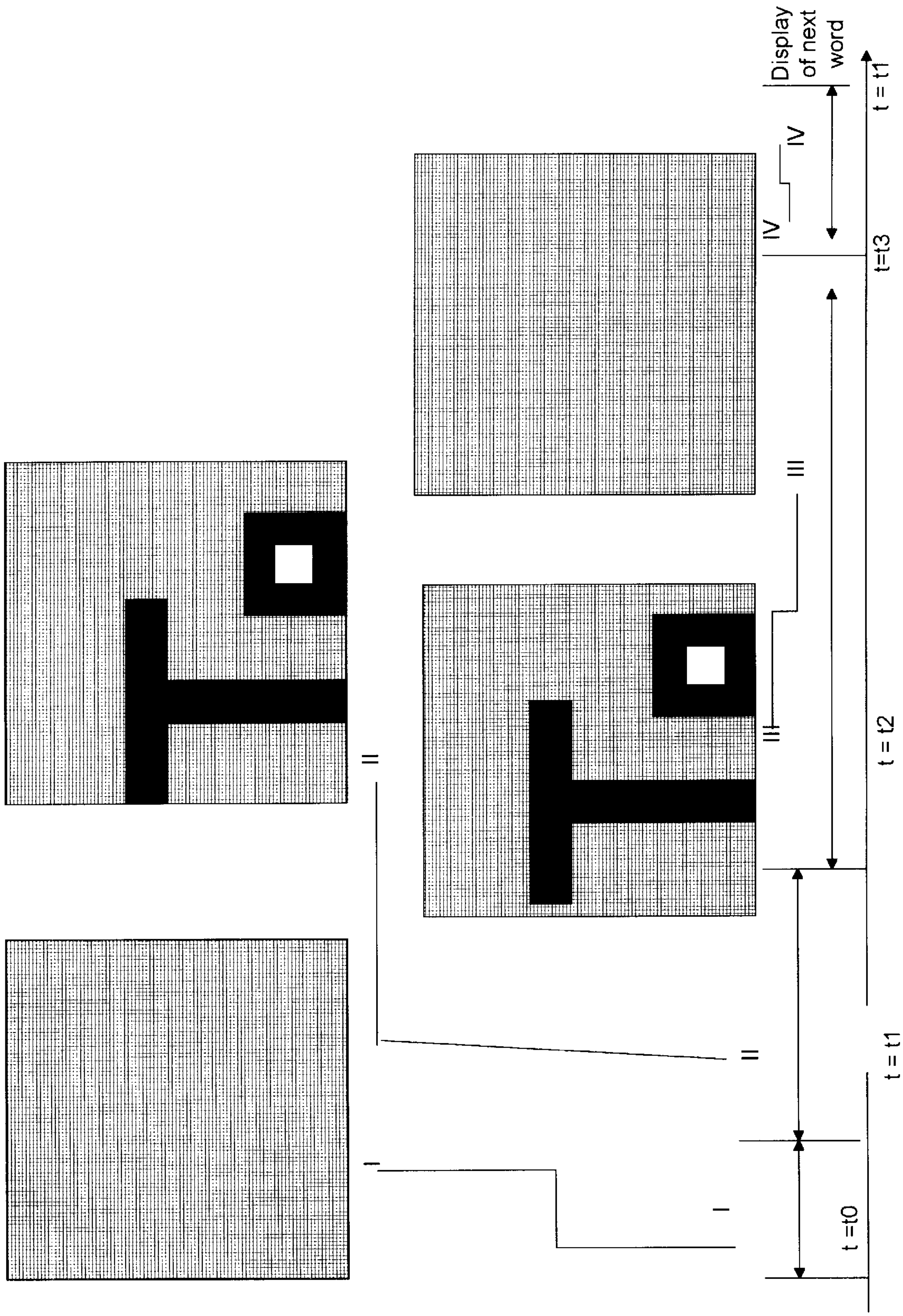
FIG. 4A is an exemplary illustration showing a first embodiment of the method for displaying a word of an electronic document in accordance with the word-shifting process of the present invention.

FIG. 4A is an exemplary illustration showing a first embodiment of the method for displaying a single word of an electronic document on a screen in accordance with the present invention. As illustrated, each individual word of the electronic document to be read and displayed on the screen preceded (and followed) by a brief period of a blank or clear screen as shown in periods I and IV of FIG. 4A, respectively. In particular, for the time Periods between times $t_0$ and $t_1$ (Period I) and after time $t_3$ (Period IV: which is a repeat of Period I) the screen is cleared of any text. In between periods I and IV, the word to be displayed (in this case "To") is displayed in two separate and independent manners during periods II and III, respectively. In particular, for the time period between times $t_1$ and $t_2$ (Period II) the word "To" is displayed for the first time, whereas at time $t_2$ (the beginning of Period III) the word "To" is shifted to the right (in this example) a predetermined number of pixels (in this example, one pixel).

In accordance with the present invention, the shifting of the word a predetermined number of pixels during the time in which the word is displayed on the screen is believed to allow the user to read the electronic document faster with increased comprehension of the displayed text due to an increase of the impact of the displayed word on the user's visual cortex. The length of Period I is preferably chosen to be in the range from about 0.0001 second to about 0.005 second which approximately corresponds to the briefest periods achievable for refreshing the screens of conventional high and low speed monitors, respectively. The length of Period II is preferably chosen to be in the range from about 5 to 10 times the length of Period I which corresponds to the range from about 0.0005 second to about 0.05 second. The length of Period III is dictated by the user's selection of the overall word display speed. For example, for word display speeds of 60 words per minute to 3,000 words per minute, Period III would range from about slightly below 1 second to about slightly below 0.02 second, respectively. (The fact that the length of those periods would be "slightly below" those times is attributable to Periods I and II which must be added to Period III to obtain the overall word display speed.) Depending on whether a high or low speed screen is used, or whether a low or high display speed is desired, the length of Periods I, II and III must be adjusted accordingly so that the overall display speed can be achieved.

Although the amount of shift of the word is illustrated in FIG. 4A to be one pixel, other amounts of shift can be employed if desired (for example, shifting in the range from about 1 to about 10 pixels). In addition, for languages that read right to left (as opposed to left to right), the shift is preferably in the left direction. Also, for languages that read top to bottom, or bottom to top, the shift is preferably in the down or up direction, respectively. Furthermore, although the shifting of each character of the word is illustrated in FIG. 4A as being a uniform shift of the whole character, this does not have to be the case. In other words, if desired, only some or a limited number of the pixels of the character need to be shifted.

Figure 4B:
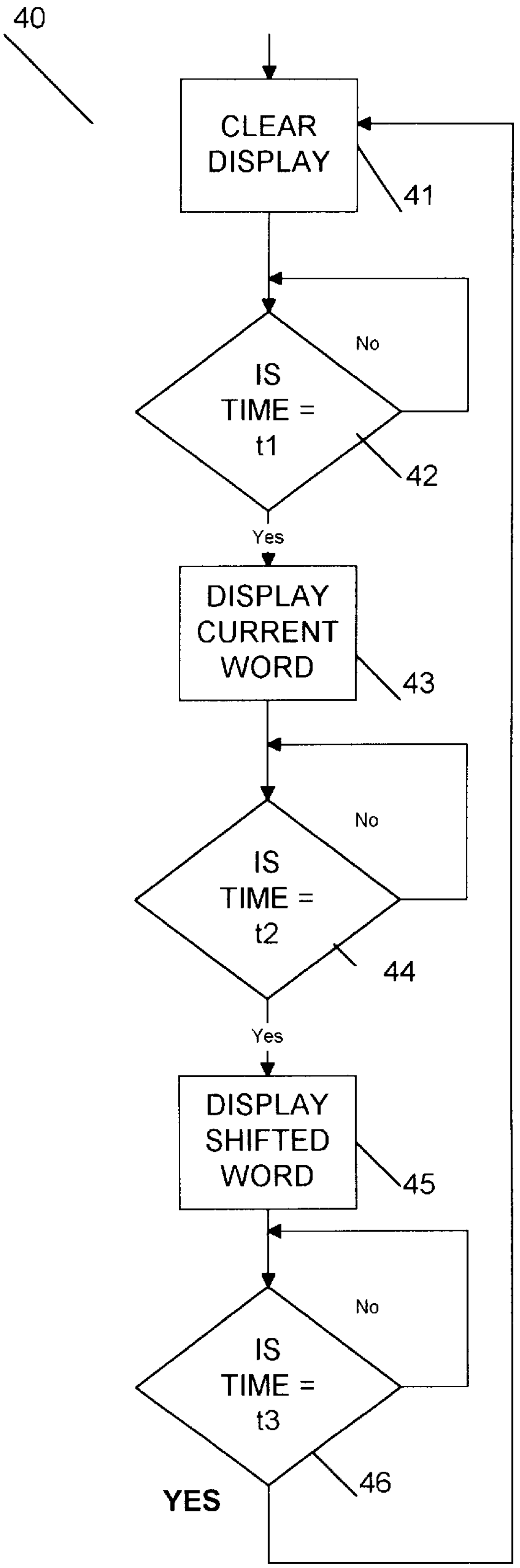
FIG. 4B is an exemplary flow diagram for the method of the present invention illustrated in FIG. 4A.

FIG. 4B is an exemplary flow diagram for the display method of the present invention illustrated in FIG. 4A. Method 40 begins at step 41 where the screen is first cleared. The method then proceeds to test 42 where it is determined whether or not the time is equal to time $t_1$. If not, the method returns to test 42. If yes, the method proceeds to step 43 where the relevant word is displayed on the screen. The method then proceeds to test 44 where it is determined whether or not the time is equal to time $t_2$. If not, the method returns to test 44. If yes, the method proceeds to step 45 where the displayed word is shifted an appropriate number of pixels on the screen. The method then proceeds to test 46 where it is determined whether or not the time is equal to time $t_3$. If not, the method returns to test 46. If yes, the method returns to step 41 where it begins the process over again for the next word to be displayed.

Figure 5:
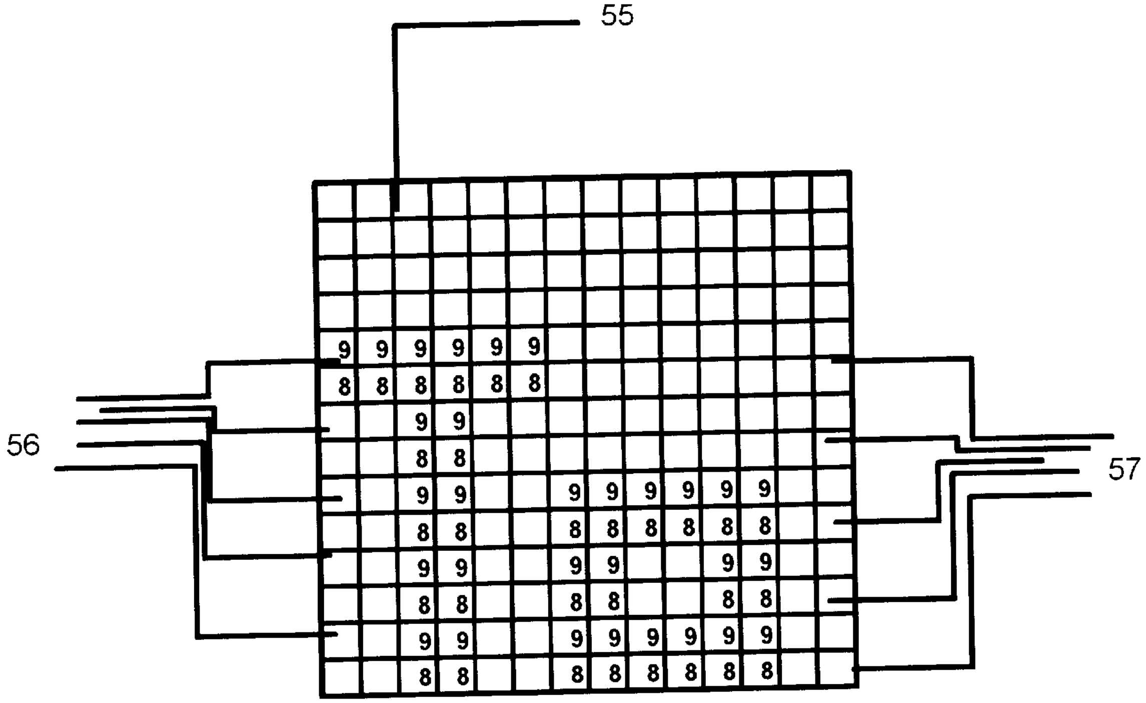
FIG. 5 is an illustration showing a second embodiment of the method for displaying a word of an electronic document in accordance with the word-shading process of the present invention.

FIG. 5 is an illustration showing a second embodiment of the method for displaying a word of an electronic document in accordance with the present invention. As illustrated, screen 55 displays the word "To" within a 16 by 16 array of pixels. In accordance with this embodiment of the present invention, each pixel of the screen can be displayed with a different shading (or color) represented by a number between the range "0" and "9." For example, "0" could represent a light shading (e.g., white), whereas "9" could represent a dark shading (e.g., black), with numbers in between that range representing various degrees of grey. As illustrated in FIG. 5, the word "To" is displayed with alternating bands of shadings represented by the values "9" and "8." In particular, rows 56 of screen 55 are shaded with a shading having a value "9", whereas rows 57 are shaded with a shading having a value "8."

In accordance with the present invention, the use of bands of manipulated shading intensity is believed to allow the user to read the electronic document faster with increased comprehension of the displayed text due to an increase of the impact of the displayed word on the user's visual cortex. Preferably, the bands of shading are one pixel high for text (characters) read in a left to right or right to left manner, or one pixel wide for text (characters) read in a top to bottom or bottom to top manner. Thicker bands can be used if desired.

In accordance with the present invention, it is preferable that the "banding" process be employed with a color screen or monitor similar to those used in present-day desk- or lap-top computer systems. In particular, it is preferable that a monitor employing a RED, BLUE, GREEN color trivalence format having respective red, blue and green colors each capable of being able to take on color values in a range from "0" to "255." If such a color monitor is employed, and the user selects one particular color for the display of the subject text, FIG. 6 is an exemplary flow diagram of a preferred embodiment of the method of the present invention for displaying the text in a "banded" format on such a screen.

Process 60 begins at test 61 where it is determined whether or not the color that the user has selected the text to be displayed in ($R=R_{us}$; $B=B_{us}$ ;$G=G_{us}$) is below neutral grey. In other words, it determines if the color trivalence ($R=R_{us}$; $B=B_{us}$ ;$G=G_{us}$) is below (R=192; B=192; G=192) for the exemplary "0" to "255" color schemes. If yes, the process proceeds to step 63 where the banded color is set to ($R=R_{us}$; $B=B_{us}+3$; $G=G_{us}+3$) so that the blue and green color values are increased by 3 color units. If no, the process proceeds to step 62 where the banded color is set to ($R=R_{us}-3$; $B=B_{us}$; $G=G_{us}$) so the red color value is decreased by 3 color units. In accordance with the present invention, this approach is used to harmonize the manipulated color shift in the bands with the color preference of the user. In particular, those users selecting a color generally below neutral grey (shading toward black), can be considered to be expressing a preference for blue-green and, accordingly, the color of the display in the banded areas is shifted towards that preference. Conversely, those users selecting a color generally above neutral grey, can be considered to be expressing a preference for the red end of the visible spectrum and, accordingly, the color of the display in the banded areas is shifted towards that particular preference. Although it is preferable to shift the color 3 units in one particular direction in the banded regions, other amounts of color shift could as well be employed.

Figure 6:
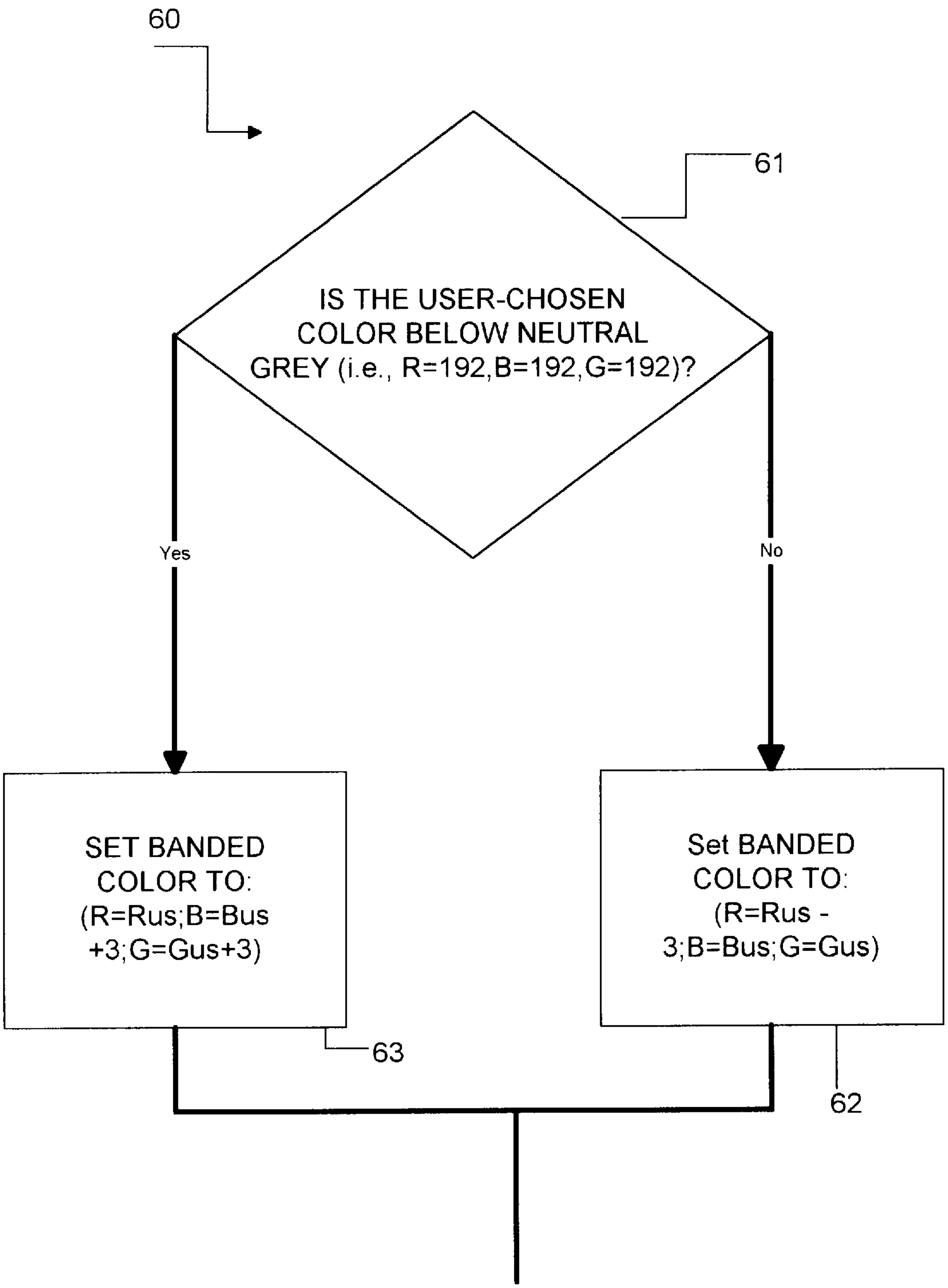
FIG. 6 is an exemplary flow diagram for a third embodiment of the method for displaying a word of an electronic document on a color screen in a "banded" format in accordance with the present invention.

Although FIGS. 5 and 6 illustrate only two of many possible variations of the shading or banding aspect of the present invention, if desired, other schemes for varying the intensity, color or shading of the displayed text can be employed. For example, instead of employing "bands" of intensity shading, one could just as well use other types of shading that cause the displayed characters to have the illusion of texture or variation in aspect (i.e., a variation in the overall look and feel).

In addition to shifting the displayed word a predetermined number of pixels (for example, one pixel to the right), and employing a banded shading pattern within the display, the present invention also includes a method for positioning a given word within the display in order to allow the user to modify the font size for easy and fast reading. In particular, the display device of the present invention is capable of maintaining a predetermined amount of "white" space above the displayed word so as to accommodate an adequate so-called "profile sweep" of the word during reading. Specifically, if a user desires to display a word in a font size that is too big for the chosen display window size, the method of the present invention positions the word so that the word is shifted down in the display (as opposed to up). This guarantees that a predetermined amount of "white" space will exist above the word so that with a profile sweep of the word during reading by the user, the word can still be typically recognized. This method is based on the assumption that it is the top portion of a character that is more important to recognition than the bottom portion. In other words, if a given portion of a character must be clipped in order to fit the character within the display, then it is preferable to clip the bottom portion (as opposed to top) of the character.

Figure 7A:
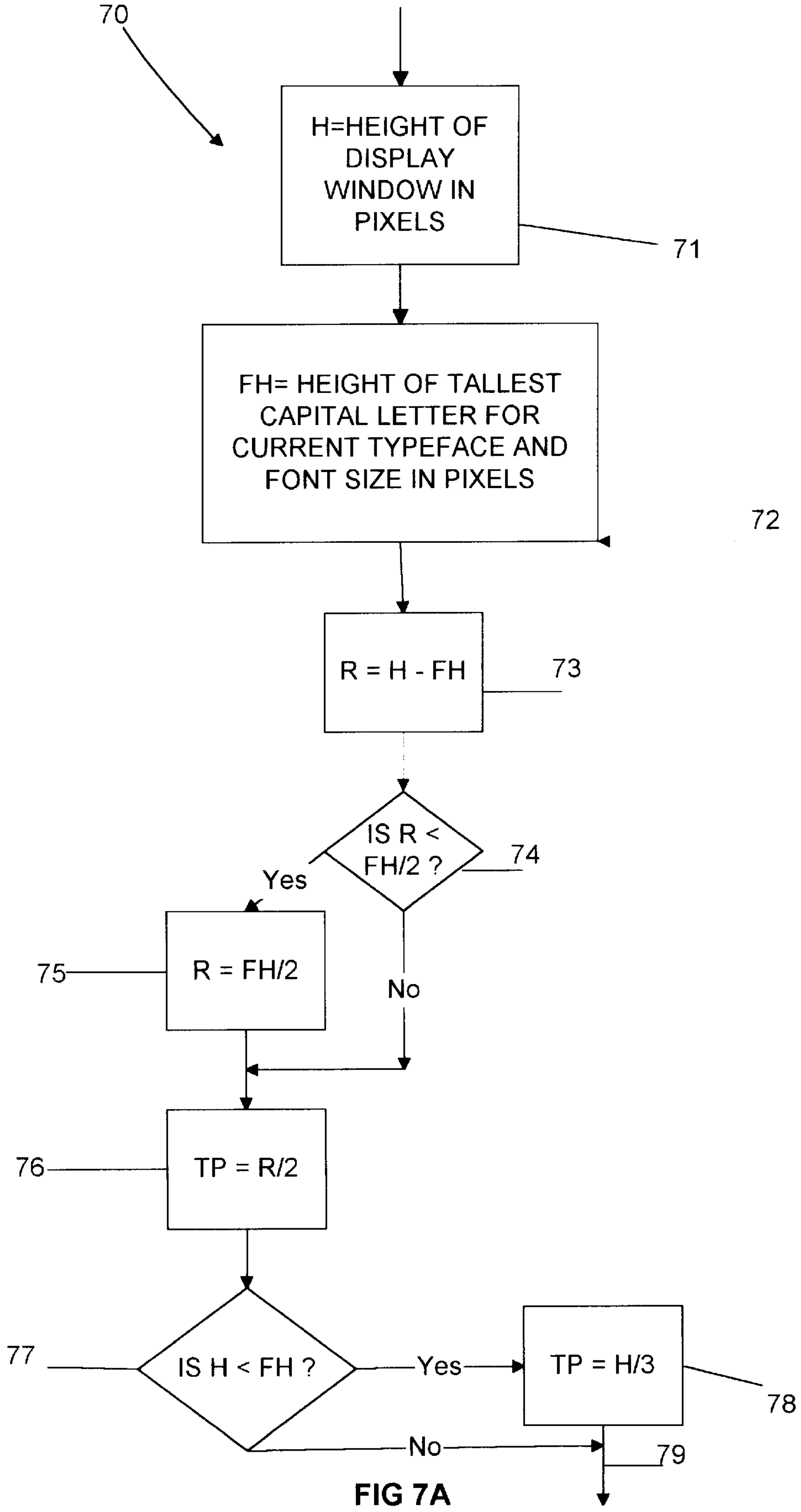
FIG. 7A is an exemplary flow diagram of one embodiment of the present invention for positioning the words of a given font size of an electronic document within a display of a given height.

In accordance with this aspect of the present invention, FIG. 7A is an exemplary flow diagram of one embodiment for positioning the words of a given font size of an electronic document within a display of a given height. Process 70 begins at step 71 where the height H is assigned the value of the height of the display window size selected by the user in pixels. The process then proceeds to step 72 where the font height FH is assigned the value of the height of the tallest capital letter in pixels for the typeface and font size selected by the user. The process then proceeds to step 73 where R is assigned the value of the difference between H and FH. The process then proceeds to test 74 where it is determined if R is less than FH/2. If yes, the process proceeds to step 75 where R is assigned the value FH/2. If no, the process proceeds directly to step 76 where the top position of the displayed characters TP is assigned the value R/2. After step 76, the process proceeds to test 77 where it is determined whether H is less than FH. If no, the top position of the characters TP is not altered and the process is completed at step 79. If yes, the process proceeds to step 78 where the top position of the characters TP is assigned the value H/3 so as to maintain a "white space" to display height ratio of 1/3.

Figure 7B:
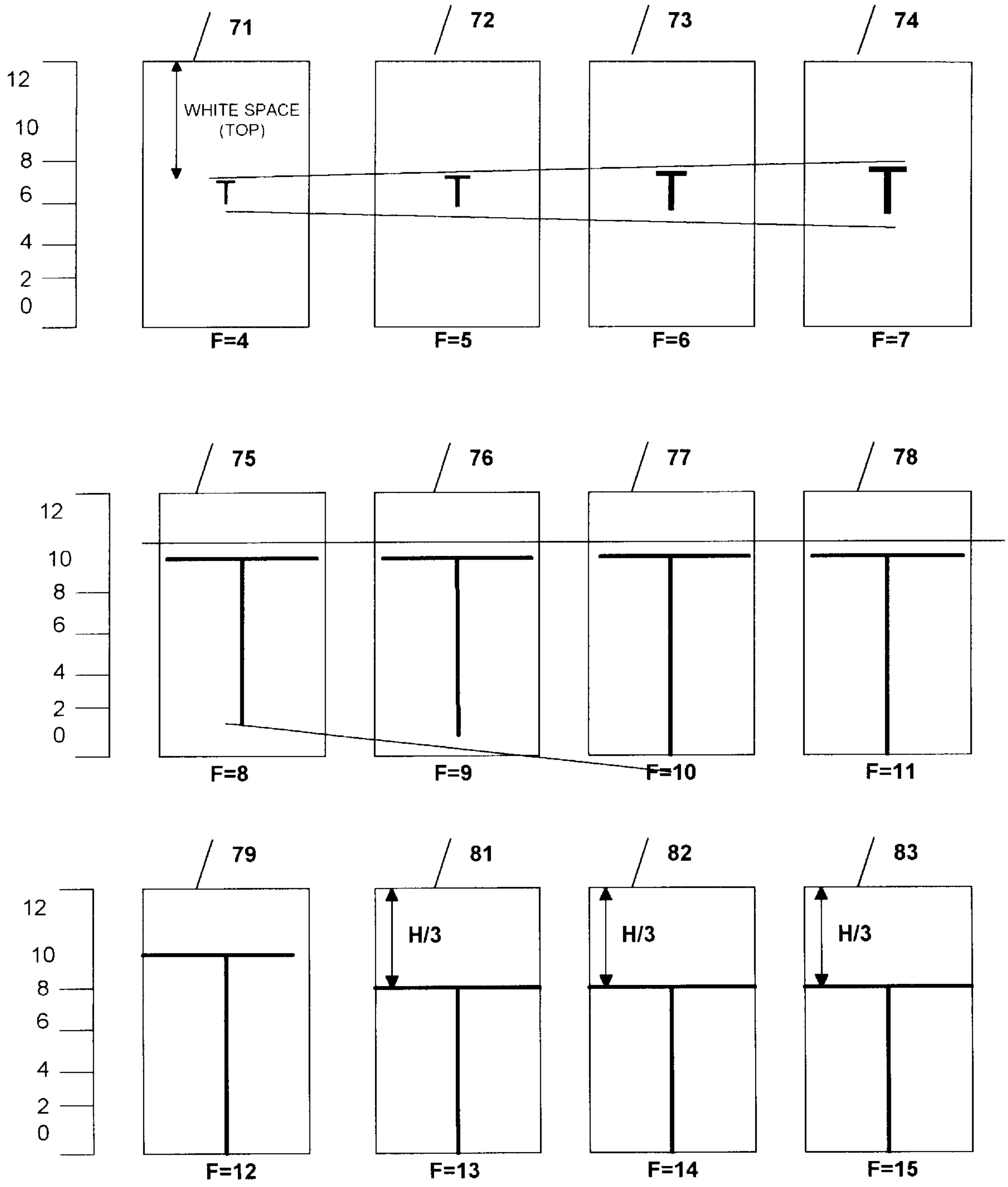
FIG. 7B is an illustration showing an embodiment of the method of FIG. 7A.

FIG. 7B is an illustration showing an embodiment of the method of FIG. 7A. As shown in FIG. 7B, the letter "T" is displayed at font sizes F ranging in value from F=4 (display 71) to F=15 (display 83) for a display size height H of 12. As illustrated in displays 71, 72, 73 and 74 (corresponding to font sizes 4, 5, 6 and 7, respectively), the letter "T" is generally centered in the display for these font sizes because the amount of "white space" above the letter is generally adequate to accommodate the size of the font. For font sizes F=8 to F=12 (corresponding to displays 75 to 79, respectively), the letter "T" starts out centered in the display (in display 75), but as the font size increases, the letter begins to be shifted "down" so as to provide an adequate amount of "white space" above the letter. In this particular embodiment, since the down-shifting begins at a white space to font size ratio of two to eight (see display 75), it is referred to as an embodiment that obeys a so-called "two-eights white space" rule. Beginning at F=10 (see display 77), the letter "T" starts to be clipped or cut-off at the bottom in order to accommodate the desired amount of "white space" above the letter. For font sizes F=13 through 15 (corresponding to displays 81 to 83, respectively), the display does not change because once a white space to display height ratio of one-third is achieved, there is no more need for the letter "T" to be shifted down in the display.

Although FIGS. 7A and 7B illustrate embodiments of the present invention that obey a so-called "two-eights white space" rule, the display device of the present invention could just as well follow other common white space rules, or a combination of such rules. For example, if it is desired to generally follow the "two-eights white space" rule illustrated in FIGS. 7A and 7B, but to also follow a so-called "three-eights white space" rule during certain periods when it is determined that there would be adequate processing time to compute the three-eights rule white space result, such a process could incorporate the following additional steps if it is desired. First, the process could estimate whether or not the size of the difference between the result achieved using a three-eights rule and two-eights rule would justify spending the additional processing time calculating the three-eights rule result. If so, the process could then determine if the total available white space was such that if one shifted the letter down in the display (to accommodate a three-eights white space rule) there would still be white space present below the letter. If there would not be, this would mean that the letter is already clipped or cut-off at the bottom and it would not make a difference whether or not the three-eights white space result is calculated. If there would be white space left under the letter, then the process could proceed to calculating the three-eights white space rule result and shift the letter down in the display according to that rule.

In addition to the above-described processes of time shifting, shading and positioning (in the up and down direction) a given letter within the display, the present invention can also include a method for placing the displayed word either left or right-justified or centered within the display as desired by the user. It is believed that the left-justified method is the fastest and easiest mode for reading displayed text.

Accordingly, a device and method for displaying the text of an electronic document one word at a time using a low-cost processor for controlling the reading and displaying of the document has been described. In accordance with the preferred embodiment of the present invention, the device and method is implemented with a processor programmed in the PROLOG language or some other equivalent language. PROLOG offers a language ideally suited to the manipulation of words. This language provides integral predicates for the manipulation of the underlying graphical user interface as well as the standard predicates for manipulation of the processor operating system. Additionally, it is preferable (although not required) that the chosen PROLOG implementation: (1) conform to the Edinburgh standard syntax for the language; (2) be able to present a program in a compiled form in the native machine code for the underlying platform; and (3) provide multitasking or multiprocessing and 32 bit instruction set capability. The follows describes the PROLOG implementation of the preferred embodiment of the present invention.

A. General Description Of The Preferred PROLOG Implementation

For the preferred embodiment, a real-time software engine is employed within the PROLOG language. Specifically, intelligent agent technology is used to create and maintain a multithreaded real-time state engine. The program is composed of several intelligent software agents each with a specific area of expertise. These agents are able to operate independent of all other agents. All of these agents have access to a common database of operational parameters.

These agents employ bidirectional inter-agent communication to create and control the effect of the real time display within the graphical user interface. The inter-agent communication takes place between the specific event or service agents and a central state controlling agent. Each of the agents is developed from a common template and then given specific knowledge bases to manipulate.

Figure 8:
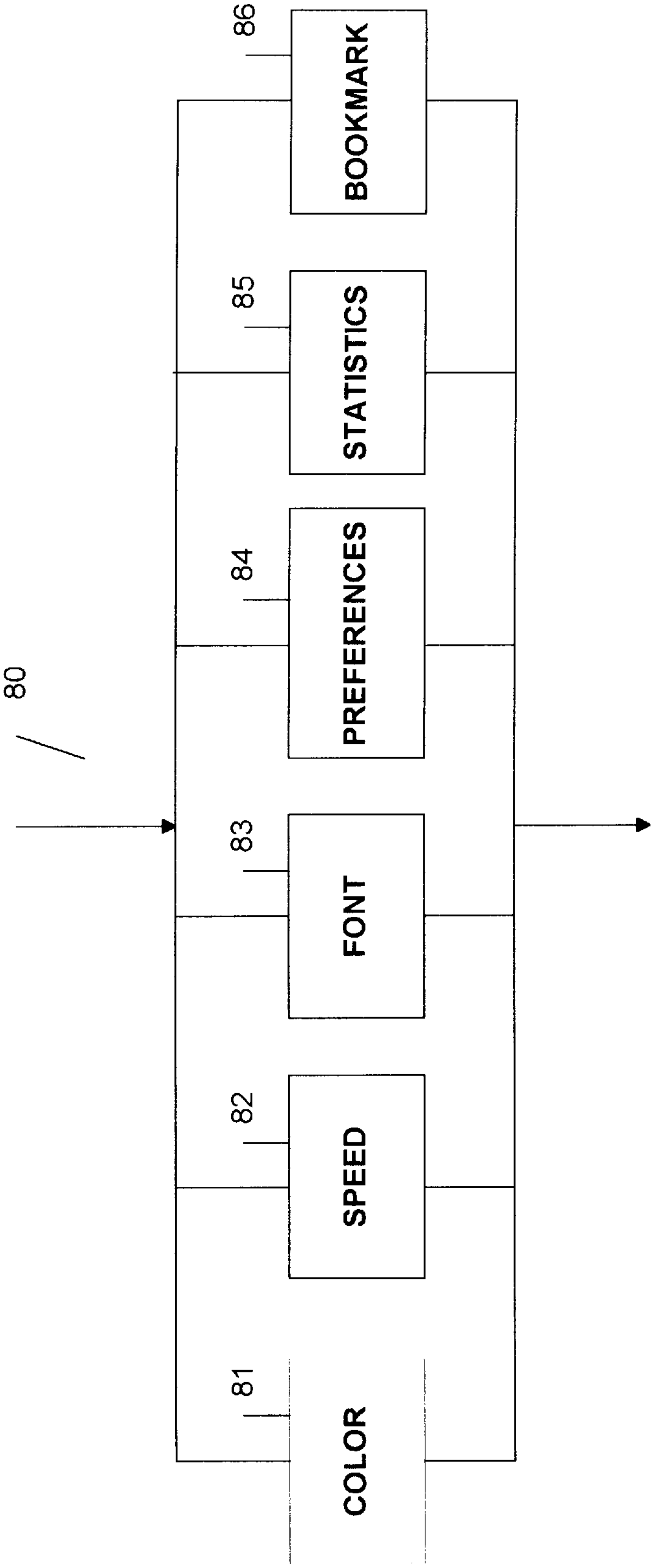
FIG. 8 is an exemplary logic diagram for the preferred embodiment of the legibility process in accordance with the present invention.

Specifically, the engine is composed of the following agents: (1) Displaying; (2) Reading; (3) Color; (4) Speed; (5) Font; (6) Preferences; (7) Statistics and (8) Bookmarks. Each agent is composed of a core reactive predicate for transfer of the control of program control, and a supporting database of predicates describing the events and appropriate responses. Agents (3) through (8) correspond to legibility agents for legibility process 38 discussed above in connection with FIG. 3. FIG. 8 is an exemplary logic diagram for this embodiment of the legibility process in accordance with the present invention. Process 80 includes color process 81, speed process 82, font process 83, preferences process 84, statistics process 85 and bookmark process 86 all of which run simultaneously in accordance with the process of the present invention and will be discussed in more detail below.

As discussed above, unlike in conventional so-called sequential processes, the embodiment does not employ a single message processing loop waiting to react to a user's input in the form of key strokes or mouse movements. Rather this embodiment uses multiple threads of execution, each created during program initialization. These threads of execution are kept alive for the duration of the program by the mechanism of backtracking and the repeat predicate unique to agent technology. The condition for termination of all of the agents is program closure. Each agent can be considered to be a single threaded limited state machine.

The engine of the present embodiment is devoted to real-time control for the reading experience of the user. This real time focus is maintained as the design pattern throughout the program and all agents. Such focus extends to the engine sampling the operating system for messages or events as it deems appropriate.

B. Description Of The Preferred PROLOG Intelligent Agents

Each of the agents in the preferred embodiment of the present invention is created from the same basic template. Each agent has at least two states: (1) waiting and (2) reacting. When reacting to either a user-initiated event or another agent, each agent uses its unique behavior database which is composed of predicates unique to its circumstances.

Common to all agents is the "settings" predicate. This predicate is a knowledge base of word keyed values which reflect either the current state or parameters of behavior for the program as a whole. The settings database also contains values pertinent to each of the individual agents.

Several of the agents have the ability to accept user input through dialog windows. These windows are presented to the user and the user preferences are captured when the user accepts or otherwise closes the dialog window. The agent in charge of the dialog monitors the dialog for the user's response or other changes. When these changes occur, the agent then takes the appropriate action based on its specific behavior database. These actions may include items connected to the program's function or appearance, but the majority of the information captured relates to legibility factors such as color, speed of display, or typeface. This information may also include actions to take in response to the content being read by the program.

These dialog agents each have the ability to hide or display the dialog window in response to user action. Each of the dialog-based agents knows how to clear and populate its associated dialog through sampling of the settings database or their specific behavior predicates. Each of these agents also knows to record any changes to the dialogs position on the screen. These changes are maintained in real time within the settings database.

These dialog agents use the inter-agent communications channel of the common behavior predicates to provide program control. These predicates include the settings predicate which uses the tuple values to provide a search key and the corresponding value. These values may be of any data type including numeric, strings, lists or compound types such as PROLOG atomic terms.

These dialog agents use the inter-agent communications channel of the common behavior predicates to provide the program interface look. As any aspect of the interface is presented to the user, it first consults the current information within the settings knowledge base. Found within this information is a description of the current state of the program as well as a history of the previous states within a list. The current state of the program is used to instantiate the interface to appropriate visible representations of the state of activity within the program, e.g., a STOP button or MENU item can be disabled unless the program is in the READING state. Similarly, the START button or MENU item is disabled unless the program is in the READY state.

The following discusses the preferred agents in accordance with the PROLOG implementation of the present invention.

1. The Color Agent

The Color Agent is activated by a user-generated event from the program menu. This agent uses the settings predicate [i.e., settings(current_color, [R,G,B,R',G',B'])) to communicate color changes to the display agent, where the second argument is a listing of fore and background colors expressed as red, green, and blue values for each.

This agent activates a dialog for communication with the user. If the dialog is hidden, it gives it the focus. This dialog captures the user's preferences for color through either a selection from a predetermined palette or through custom color control via a series of slide bar controls, one for each of the color values for each the foreground and the background.

As with all of the agents in accordance with the present invention, changes in the color are reflected in real time. Should the display be active at the time that a color change is made, the color of the display will change with each incremental update to any of the color slide controls or via the selection of a new palette.

The color agent uses the database predicates for retracting and asserting the new value into the settings database.

2. The Speed Agent

The Speed Agent is activated by a user-generated event from the program menu. This agent uses the settings predicate [i.e., settings(current_delay, Value)] to communicate the delay factor to the Display Agent and where Value is an integer value. The current delay value represents the number of clock ticks to suspend the display of the current word. This value is derived by the formula:

WPM=number of words per minute chosen by the user;

standard_word_display_time=time required to display a six character word in 50 point Times New Roman typeface;

CT (clock ticks)=one minute expressed as clock ticks relative to the cpu;

SDD (standard display deviation)=WPM * standard_word_display_time;

XD=CT−SDD;

CD(current delay) =XD/WPM

The above formula allows for speeds as low as one word per minute and as fast as 3,000 words per minute. The 3,000 words per minute upper limit is the theoretical maximum speed of display assuming fast refresh rates on the computer screen.

The Speed Agent captures the chosen number of words per minute from the speed control slide bar on the speed dialog. The user may choose to enter a words per minute number into the edit field on the dialog. This is linked to the speed control slide bar and keeps it constantly updated. As with all of the agents in accordance with the present invention, changes are reflected in real time. Should the display be active at the time that a speed change is made, the speed of the display will change with each incremental update to the speed control slide bar.

The speed control agent uses the database predicates for retracting and asserting the new value into the settings database.

3. The Font Agent

The Font Agent is activated by a user-generated event from the program menu. This agent uses the SETTINGS predicate to set the typeface, font size, and position. The Font Agent captures the user's font preference in the font control dialog where the user selects the typeface desired from a listbox of fonts registered with and available to the underlying graphical user interface operating system. The size is set either through direct entry into an edit control or through selecting the size from a slide bar control.

4. The Preferences Agent

The Preferences Agent is activated by a user-generated event from the program menu. This agent uses the dialog to capture the user input concerning program operation and the level of reaction to the content to be expressed by the display. This dialog is composed of grouped series of check boxes to turn program operations on or off. The various levels of reaction to content are also activated or declined within the preference dialog. These preferences are maintained in real time as the user exercises a choice. These choices are placed in the settings database through the usual method of retraction and assertion.

These preferences include the following: (1) save settings on exit; (2) pause on newline; (3) pause on tab; (4) pause on period; (5) show new paragraph character on two newlines; (6) count words displayed; (7) show the statistics in the title.

5. The Statistics Agent

The Statistics Agent is activated by a user-generated event from the program menu. The Statistics Agent knows how to calculate the various reading statistics for the current session. It uses the statistics dialog to display the information calculated and accumulated. The agent uses several accumulators to maintain the count of the number of words per minute displayed. These are the actual number of words displayed as opposed to the user's target word per minute count. The discrepancy arises in that the speed of display degrades as the font size increases and/or the number of words whose length exceeds 6 characters increases. There is also the possibility that other activities within the computers operating system will rob the program of processing power required to manipulate the display at the rate chosen. There is also the possibility that the graphical display hardware and/or operating system drivers may not be adequate to the task of the display speed chosen.

6. The Bookmark Agent

The Bookmark Agent is activated by a user-generated event from the program menu. This agent accepts user commands from the buttons on the dialog. In the case of a new bookmark being chosen, this agent consults the Reading Agent and determines its position within the file. This position is then noted as having a bookmark. If this bookmark falls within a word, that word is noted in the dialog box along with the positional information.

In the case of a bookmark being selected, the agent informs the Reading Agent of the new reading position.

7. The Displaying Agent

The Display Agent can be considered the main agent in two senses: first, this agent is responsible for the display of words within the main program display window; second, this agent is responsible for the program's menu which is used to activate the other agents within the program.

The display of the words to the main program display window uses several different processes to attempt to induce a specific response from the user and to improve legibility characteristics within the computer display. These processes where discussed above in connection with FIGS. 4A, 4B, 5, 6, 7A and 7B.

This agent is responsible for manipulating the common file dialog for the operating system such that files may be selected and opened to be read. This agent is preferably not dialog based, but merely calls for the file dialog services from the operating system.

This agent is the main recipient of the inter-agent communication via the SETTINGS predicate. This agent uses the results of the other agents interaction with the user to display the words. This agent has control over the main operational thread and uses the interagent communication to inform other agents of user commands in connection with the main program window. In addition, this agent maintains positional knowledge about the main display window and is the most reactive to program states. It also has the most interface altering capability.

Furthermore, this agent is sensitive to user input and has the knowledge to display the current word to the display window in the current typeface, font size, and color. This agent preferably reacts to screen type to optimize the legibility of the word being displayed.

9. The Reading Agent

The Reading Agent has control of the file being read, and the current database of rules for tokenizing the file into words. This database includes the database of terminating characters for the current file type, and the predicates for calculating and exercising the delay factor for the display. This agent has the responsibility of calling for the display of the word when a terminating character is discovered and the appropriate delays have passed. This agent has responsibility to examine the content against the rules for display. Should the content have a match within the rules, this agent is responsible for creating the desired effect in either timing or appearance.

While the Reading Agent preferably has no direct user interaction, it is the agent primarily responsible for executing the program to meet the user's expectations. This agent therefor only receives communication. The Reading Agent is a real time software engine. Its tasks are all active software processes and include file parsing, pattern and rule matching and program control.

As a software engine, the Reading Agent preferably recognizes four states which include: (i) ready to read a file; (ii) reading a file; (iii) transitioning from ready to reading; and (iv) transitioning from reading to ready. Each of these states are discussed below.

i. State: Ready To Read A File

In the case of the first state, the next file to read has been located, opened, and the appropriate filter of predicates and database has been loaded. The agent then alters the program interface values in the settings predicate indicating the current program state.

ii. State: Reading A File

This agent reads through the file by first converting it to the default input stream then examining it character by character, matching each against the database of potential word terminating characters. The agent then alters the program interface values in the settings predicate indicating the current program state.

If the current character in the stream matches a word terminating condition, the agent uses the current word as a key to search the database of content. If the current word is found, then the associated action is performed. These actions are listed separately in this document as Display Characteristics: Actions.

iii. State: Transitioning From Ready To Reading

In transitioning from the ready state to the reading state, the agent checks the previous state history. If the transition is to read this file for the first time, then the agent ensures that any program code required is consulted into memory. This will include the reading format filter appropriate to the type of file being read. All predicates related to reading any previously opened files are first purged from memory. The agent then alters the program interface values in the settings predicate indicating the current program state. Garbage collection is disabled.

iv. State: Transitioning from Reading to Ready

In transitioning from the reading state to the ready state, the agent first notes the last position in the file, asserting the information to memory. The agent then alters the program interface values in the settings predicate indicating the current program state. The agent also closes all open source or bookmark files. Any consulted predicates are flushed from the system. Garbage collection is invoked.

C. Description Of The Operation Of Preferred PROLOG Implementation

The preferred embodiment of the PROLOG implementation is operated by first invoking the program from the graphical user interface operating system. The main window is then presented to the user. At that time the user can invoke the illustrative actions and commands detailed below.

1. Load

This calls the main Displaying Agent to invoke the operating systems common file dialog. The file selected by the user is opened and prepared for reading.

2. Start

Assuming that the Reading Engine is in a state of READY TO READ, this command starts the Reading Agent from the current position within the file. The agent then reads the file and presents each word to the display agent for rendering to the display window.

3. Stop

Assuming that the reading engine is in the process of reading a file then choice of this item causes the reading engine to stop the display of words and transition to a ready to read state.

4. Close

This command causes the program to exit.

5. Speed

The speed command brings the speed dialog to the front of the screen in its current position and places the focus of the operating system to this window. The speed control allows for the adjustment of the speed of display. Alterations in this dialog are reflected in real time in the main program display if it is currently active with the display of a file.

6. Font

The font command brings the font dialog to the front of the screen in its current position and places the focus of the operating system to this window. The font dialog allows for the adjustment of the typeface, font size, position (center or left justified) of display. Alterations in this dialog are reflected in real time in the main program display if it is currently active with the display of a file.

7. Color

The color command brings the color control dialog to the front of the screen in its current position and places the focus of the operating system to this window. The color dialog allows for the adjustment of the foreground and background color values of the display. Alterations in this dialog are reflected in real time in the main program display if it is currently active with the display of a file.

8. Preferences

The preferences command brings the preference control dialog to the front of the screen in its current position and places the focus of the operating system to this window. The preference dialog allows for the adjustment of the user preferences for program operation. This includes the reactive nature of the program, such as extra delays and extended punctuation. Alterations in this dialog are reflected in real time in the main program display if it is currently active with the display of a file.

9. Bookmark

The bookmark command brings the bookmark control dialog to the front of the screen in its current position and places the focus of the operating system to this window. This dialog accepts user input to create a bookmark in real time as the text streams through the display. This bookmark is created in memory and saved to storage if required by user preference.

10. Resize

The resize command allows the user to configure the screen to their individual requirements. The user is able to reshape the screen using the standard conventions of the operating system upon which it operates. The screen will resize and the display agent will accommodate by maintaining the proportionally required white space above the word.

D. Logic Flow Of The Preferred PROLOG Implementation

Although the PROLOG agents of present invention can be implemented using a wide variety of programming instructions and procedures, the following is a description of the logic flow for the preferred embodiment in accordance with the present invention. It will be apparent to those of ordinary skill in the art that, if desired, other forms of logic flow may also be employed to implement the method of the present invention.

1. Displaying Agent

```
start_display:
  consult settings knowledge base,
  create display window to current size and position settings.
size_display:
  apply formulas for maintaining white space to top margin values,
  alter settings knowledge base to reflect the current size of the display window, alter settings knowledge base to reflect the new top margin values.
display_word:
  consult the current word database,
  consult the settings knowledge base for current values for window size,
  consult the settings knowledge base for current values for font size,
  consult the settings knowledge base for current values for typeface,
  consult the settings knowledge base for current values for horizontal alignment,
  consult the settings knowledge base for current values for top margin,
  write blank screen,
  display current word to current legibility values,
  calculate shifted values for display,
  display word to shifted values.
message_handler(menu):
  inform appropriate agent that it is being called through the inter-agent
  communications.
message_handler(menu, load):
  call common file dialog,
  open the chosen file(s),
  call reading agent.
message_handler(resize):
  size_display.
```

2. Reading Agent

```
start_reading:
  determine file type,
  load appropriate file filter,
  fail.
start_reading:
  set file to input stream,
  consult file position carrier,
  set state to reading,
  repeat,
  read_stream,
  at end of file or stopped working state,
  reset input stream,
  close file,
  reset state to waiting.
read_stream:
  repeat,
  consult stream position carrier,
  set stream pointer to current stream position,
  read tokens from stream,
  set stream position carrier to new position,
  match_for_terminator(token),
  at end of stream or stopped working state.
match_for_terminator(token):
  token equals terminator,
  check word for reaction,
  display word,
  clean current word database from memory,
  delay to current value.
match_for_terminator(token):
  check token for reaction,
  call reaction predicate.
match_for_terminator(token):
  token does not match,
  add token to developing word.
reaction (token, reaction).
```

3. Speed Agent

```
start_speed:
  instance flag is null,
  instantiate instance flag,
  attach agent to speed dialog,
  set_speed.
start_speed:
  instance flag is positive,
  set focus to speed dialog (make visible if required),
  set_speed.
start_speed.
speed_it:
  does the window exist already,
  !,
  show dialog,
  set focus.
speed_it:
```

create the speed dialog,
create an edit field,
create a slider control with range 1 to 3000,
create close button,
set_speed.
set_speed:
consult the settings knowledge base,
determine current speed,
set slider to speed value,
set edit field to reflect the current speed.
message handler (on focus):
set_speed,!.
message handler (close):
hide dialog,
release focus.
message handler (slider change):
alter settings value to reflect the change in the user option.
message handler (edit change):
alter settings value to reflect the change in the user option.

4. Font Agent start_font:
instance flag is null,
instantiate instance flag,
attach agent to font dialog,
set font.
start_font:
instance flag is positive,
set focus to font dialog (make visible if required),
set_font.
start_font.
font_it:
does the window exist already,
!,
show dialog,
set focus.
font_it:
create the font dialog,
create a listbox,
create an edit field,
create a slider control with range 8 to 240,
create close button,
set_font.
set_font:
query operating system for list of available fonts,
populate listbox,
fail.
set_font:
consult the settings knowledge base,
determine current font,
highlight current font in listbox,
fail.
set_font:
consult the settings knowledge base,
determine current font size,
set slider to size value,
set edit field to reflect the current size.
set_font.
message handler (on focus):
set-font,!.
message handler (close):
hide dialog,
release focus.
message handler (slider change):
alter settings value to reflect the change in the user option.
message handler (edit change):
alter settings value to reflect the change in the user option.
message handler (listbox selection):
alter settings value to reflect the change in the user option.

5. Color Agent start_color:
instance flag is null,
instantiate instance flag,
attach agent to color dialog,
set_color.
start_color:
instance flag is positive,
set focus to color dialog (make visible if required),
set color.
start_color.
color_it:
does the window exist already,
!,
show dialog,
set focus.
color_it:
create the color dialog,
create 6 slide bars with range from 0 to 255,
create 6 edit fields,
create palette selection of sample color combinations,
create close button,
set_color.
set_color:
consult the settings knowledge base,
set each of the sliders to represent one of the six Red/Green/Blue values for the
foreground and background colors,
set each of the six edit field to the numeric value of one of the RGB values.
message handler (on focus):
set_color,!.
message handler (close):
hide dialog,
release focus.
message handler (slider change):
alter settings value to reflect the change in the user option.
message handler (edit change):
alter settings value to reflect the change in the user option.
message handler (palette selection):
alter settings value to reflect the change in the user option.

6. Statistics Agent start_stats:
instance flag is null,
instantiate instance flag,
attach agent to font dialog,
set_stats.
start_stats:
instance flag is positive,
set focus to stats dialog (make visible if required),
set_stats.

start_stats.

stats_it:

does the window exist already,

!, show dialog, set focus.

stats_it:

create the stats dialog, create edit fields for start time, stop time, length of time reading, word count, words per minute, create close button, set_stats.

set_stats:

query operating system for current time, if transitioning from reading to ready, use time as stop time, if transitioning from ready to reading, use time as start time, populate start and stop time and elapsed time edit fields, fail.

set_stats:

consult the settings knowledge base, determine word count, enter into edit field, calculate words per minute, enter into edit field.

message handler (on focus):

set_stats,!.

message handler (close):

hide dialog, release focus.

7. Preferences Agent start_pref:

pref_it, fail.

start_pref:

instance flag is null, instantiate instance flag, attach agent to preferences dialog, set_preferences.

start_pref:

instance flag is positive, set focus to preferences dialog (make visible if required), set_preferences.

start_pref.

pref_it:

does the window exist already,

!, show dialog, set focus.

pref_it:

else create preferences dialog.

create_pref dialog:

create the dialog with checkboxes for

'save on exit',

'buttons',

'pause on PERIOD',

'pause on TAB',

'extended punctuation —2 NL',

'extended punctuation —TAB',

'count words',

'calculate true wpm',

'stop on minimize',

'stop on all buttons',

'show stats in title',

'Close'.

set_preferences:

consult settings knowledge base, set dialog buttons to reflect current values for 'save on exit', 'buttons', 'pause on PERIOD', 'pause on TAB', 'extended punctuation —2 NL', 'extended punctuation —TAB', 'count words', 'calculate true wpm', 'stop on minimize', 'stop on all buttons', 'show stats in title'.

message handler (on focus):

set_preference,!.

message handler (close):

hide dialog, release focus.

message handler (checkbox change):

alter settings value to reflect the change in the user option.

8. Bookmark Agent start_bookmark:

instance flag is null, instantiate instance flag, attach agent to bookmark dialog, set_bookmark.

start_bookmark:

instance flag is positive, set focus to bookmark dialog (make visible if required), set bookmark.

start_bookmark.

bookmark_it:

does the window exist already,

!, show dialog, set focus.

bookmark_it:

create the bookmark dialog, create a listbox, create an edit field, create new bookmark button, create select bookmark button, create close button, set_bookmark.

set_bookmark:

consult the bookmark knowledge base, determine current bookmarks, populate the listbox with bookmarks for this document, set edit field to reflect the current file position.

message handler (on focus):

set_bookmark,!.

message handler (close):

hide dialog, release focus.

message handler (new button press):

sample file position, capture word if one is current, add bookmark to listbox, alter bookmark knowledge base to include current file position and word.

message handler (select button press):

reset current file position to reflect position of selected bookmark.

* * *

In accordance with the present invention, the above PROLOG implementation of the invention allows a display device to achieve continuous control of the word display speed in a range from less than 1 word per minute to over 3,000 words per minute (on high speed monitors) while at the same time being able to allow the user to continuously alter the legibility characteristics of the words, on demand, without substantial interruption of the displaying process. In accordance with the present invention, such speeds can be achieved without the need for first converting the stored electronic document into a second document or file before its displayed. This is achieved because the method of the present invention includes three processes (i.e., reading, displaying and legibility processes) which simultaneously execute, in a parallel fashion, separate goals for controlling the display device. Such method is in contrast to methods that would employ sequential processing.

Although the above device and method of the present invention has been described with reference to FIGS. 1 and 2 which includes processor 12 programmed in accordance to the methodology depicted in FIGS. 3–8 discussed above, the present invention also includes a magnetic or optical recording medium for use with processor 12. The magnetic or optical recording medium of the present invention includes a plurality of regions capable of being selectively altered in either of two substantially different ways to represent a "0" and "1" , respectively. The plurality of magnetic or optical regions of the present invention are coded, as is known in the art, to store program code containing instructions for operating the device in accordance with the description herein.

Thus, a device and method for displaying the text of an electronic document on a one-word display has been disclosed. One skilled in the art will appreciate that the present invention can be practiced by other than the described embodiments, which are presented here for purposes of illustration and not of limitation, and that the present invention is limited only by the claims that follows.

What is claimed is:

1. A device for displaying the text of an electronic document on a screen, one and only one word at a time, comprising:

a processor having an input adapted to be coupled to a storage device for storing the electronic document;

a screen coupled to the processor for sequentially displaying one and only one word of the document at a time; and a user control coupled to the processor for allowing the user to control the legibility of the sequentially displayed words in real time.

2. The display device of claim 1, wherein the processor allows the user to continuously alter the legibility of the displayed words without substantial interruption of displaying the document.

3. The display device of claim 1, wherein the processor comprises:

(a) a legibility control coupled to the user control for receiving instructions from the user on desired legibility parameters of the displayed words; and (b) a reading/display control having a first terminal adapted to be coupled to the storage device and having a second terminal coupled to the screen for displaying the words of the electronic document.

4. The display device of claim 3, wherein the legibility control and reading/display control are operated simultaneously so as to receive instructions from the user at substantially the same time that words of the electronic document are being displayed on the screen without substantial interruption of the display.

5. The display device of claim 4, wherein the processor comprises a microprocessor.

6. The display device of claim 4, wherein the device comprises a computer and wherein: the processor comprises a microprocessor, the screen comprises a computer monitor and the user control comprises a keyboard.

7. The display device of claim 1, wherein the screen displays each word of a portion of the document more than once before displaying the next sequential word of the document.

8. The display device of claim 7, wherein each word of a portion of the document is displayed twice.

9. The display device of claim 8, wherein each word of a portion of the document is displayed on the screen the first time during a time period in the range from about 0.0001 second to about 0.005 second and displayed on the screen the second time during a time period in the range from about 0.02 second to about 1 second.

10. The display device of claim 1, wherein the screen displays each word of a portion of the document more than once before displaying the next sequential word of the document and wherein each such word is shifted on the screen from the location it was previously displayed.

11. The display device of claim 10, wherein the shifted words are shifted in a range from about 1 to about 10 pixels.

12. The display device of claim 10, wherein the shifted words are shifted to the right about 1 pixel.

13. The display device of claim 1, wherein the screen displays each word of a portion of the document with a shading intensity that varying within the display of such words.

14. The display device of claim 13, wherein the shading intensity is varied in a series of bands.

15. The display device of claim 14, wherein each band has a width in the range from about 1 pixel to about 10 pixels.

16. The display device of claim 15, wherein the series of bands are in the horizontal direction and are about 1 pixel high.

17. The display device of claim 13, wherein the shading intensity is varied by varying the color within the display of such words.

18. The display device of claim 1, wherein the displayed words are positioned within the screen so as to maintain a predetermined amount of space above the displayed words as the font size is modified.

19. The display device of claim 3, wherein the legibility control allows the user to control the following characteristics of the displayed words: color, display speed and font.

20. The display device of claim 1, wherein the words can be displayed at speeds in the range of 1 to 3,000 words per minute while allowing the user to control the legibility characteristics of the displayed words without substantial interuption of the display.

21. A method for displaying the text on an electronic document on a screen, one and only one word at a time, comprising the steps of:

(a) electronically reading the document stored on a storage device;

(b) sequentially displaying one and only one word of the document at a time on the screen; and (c) altering the legibility of the sequentially displayed words in real time without substantial interruption of step (b).

22. The method of claim 21 wherein steps (a), (b) and (c) are performed substantially simultaneously in real time.

23. The method of claim 21, wherein step (b) comprises displaying each word of a portion of the document more than once before displaying the next sequential word of the document.

24. The method of claim 23, wherein each word of a portion of the document is displayed twice.

25. The method of claim 24, wherein each word of a portion of the document is displayed on the screen the first time during a time period in the range from about 0.0001 second to about 0.005 second and displayed on the screen the second time during a time period in the range from about 0.02 second to about 1 second.

26. The method of claim 21, wherein step (b) comprises displaying each word of a portion of the document more than once before displaying the next sequential word of the document and wherein each such word is shifted on the screen from the location it was previously displayed.

27. The method of claim 26, wherein the shifted words are shifted in a range from about 1 to about 10 pixels.

28. The method of claim 27, wherein the shifted words are shifted to the right about 1 pixel.

29. The method of claim 21, wherein step (b) comprises displaying each word of a portion of the document with a shading intensity that varying within the display of such words.

30. The method of claim 29, wherein the shading intensity is varied in a series of bands.

31. The method of claim 30, wherein each band has a width in the range from about 1 pixel to about 10 pixels.

32. The method of claim 31, wherein the series of bands are in the horizontal direction and are about 1 pixel high.

33. The method of claim 29, wherein the shading intensity is varied by varying the color within the display of such words.

34. The method of claim 21, wherein step (b) comprises positioning each word within the screen so as to maintain a predetermined amount of space above the displayed words as the font size is modified.

35. The method of claim 21 wherein step (c) comprise s altering the following characteristics of the displayed words: color, display speed and font.

36. The method of claim 21, wherein the words can be displayed at speeds in the range from 1 to 3,000 words per minute while allowing the user to control the legibility characteristics of the displayed words without substantial interuption of the display.

37. A recording medium having a plurality of magnetic or optical regions, said regions each being capable of being selectively altered in either of two substantially different ways, the regions being coded to store program code, said program code comprising instructions for displaying the text of an electronic document on a screen, one and only one word at a time, including the following steps:

(a) electronically reading the document stored on a storage device;

(b) sequentially displaying one and only one word of the document at a time on the screen; and (c) altering the legibility of the sequentially displayed words in real time without substantial interruption of step (b).

38. The recording medium of claim 37 wherein steps (a), (b) and (c) are performed substantially simultaneously in real time.

39. The recording medium of claim 37, wherein step (b) comprises displaying each word of a portion of the document more than once before displaying the next sequential word of the document.

40. The recording medium of claim 37, wherein step (b) comprises displaying each word of a portion of the document more than once before displaying the next sequential word of the document and wherein each such word is shifted on the screen from the location it was previously displayed.

41. The recording medium of claim 37, wherein step (b) comprises displaying each word of a portion of the document with a shading intensity that varying within the display of such words.

* * * * *